(12) United States Patent
Holl

(10) Patent No.: US 7,110,872 B2
(45) Date of Patent: Sep. 19, 2006

(54) METHOD AND DEVICE FOR DETECTING THE COMPLETE STOP OF A VEHICLE

(75) Inventor: Eberhard Holl, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 870 days.

(21) Appl. No.: 09/748,341

(22) Filed: Dec. 22, 2000

(65) Prior Publication Data

US 2001/0020208 A1 Sep. 6, 2001

(30) Foreign Application Priority Data

Dec. 30, 1999 (DE) .................. 199 63 750

(51) Int. Cl.
*G06G 7/00* (2006.01)

(52) U.S. Cl. ....................................... 701/70

(58) Field of Classification Search .............. 701/1, 701/70, 71, 74
See application file for complete search history.

(56) References Cited

U.S. PATENT DOCUMENTS 5,129,496 A * 7/1992 Sigl et al. .................... 192/49

FOREIGN PATENT DOCUMENTS

| DE | 195 03 270 | 8/1996 |
| DE | 196 25 919 | 1/1998 |
| EP | 0 812 747 | 2/1997 |
| GB | 2 297 619 | 8/1996 |

OTHER PUBLICATIONS

A. Van Zanten et al. "FDR—die Fahrdynamikregelung von Bosch" (Bosch Vehicle Dynamics Control System)—Automobiltechnische Zeitschrift (ATZ) 96, 1994, 11, pp. 674-689.

* cited by examiner

*Primary Examiner*—Thu V. Nguyen
(74) *Attorney, Agent, or Firm*—Kenyon & Kenyon LLP (57) ABSTRACT

Method and device for detecting the complete stop of a vehicle, complete-stop detection being carried out as a function of the measured speed of at least one of the vehicle's wheels and as a function of a quantity representing the braking force when the vehicle is braked.

34 Claims, 8 Drawing Sheets

METHOD AND DEVICE FOR DETECTING THE COMPLETE STOP OF A VEHICLE

The present invention relates to a method and device for detecting the complete stop of a vehicle, the complete stop being detected as a function of the measured speed of at least one of the vehicle's wheels. Such a method is known from the German DE 195 03 270 A1, for example. It describes determining a complete-stop instant of a vehicle by obtaining a suitable estimate for the vehicle's complete-stop instant by ascertaining a speed-threshold value for at least one wheel during a braking phase, by subsequently acquiring at least one additional speed value for the wheel at a plurality of consecutive points of time until a measurable minimum speed is reached, and by estimating the complete-stop instant by generating one or more speed gradients between the acquired speed values and extrapolating them to the speed zero. However, this method for determining the complete-stop instant has proven to not always be sufficiently accurate.

The object of the present invention is, therefore, to provide an improved method and device, respectively, for detecting the complete stop of a vehicle.

The present invention achieves the objective by a method in accordance with claim 1 and by a device in accordance to claim 16. In this context, the complete stop of a vehicle is detected as a function of the vehicle's speed or of the speed of at least one wheel of the vehicle, as well as of a function of one quantity representing the braking force when the vehicle is braked. In this context, the quantity representing the braking force is advantageously the braking pressure, in particular for a hydraulic brake. As a rule, detecting complete stop denotes detecting the complete-stop instant. However, detecting complete stop can also include detecting the complete-stop location.

The procedure in accordance with the present invention makes it possible for a vehicle's complete stop to be recognized with much greater precision than does the known method. If, for example, shortly before complete stop, the pressure on the brake is eased in order to reduce the holding pressure (chauffeur braking), significantly increased accuracy in detecting the complete stop is attained with the present invention. This is also true when maneuvering on an incline, in which case the braking pressure is often reduced just prior to reaching the complete-stop instant to the point that the vehicle moves at a steady, very low speed. In such cases, the present invention also makes it possible to detect complete stop of the vehicle with significantly improved accuracy.

Moreover, in an advantageous embodiment of the present invention, complete-stop detection occurs as a function of at least two speed thresholds, a first speed threshold and a second speed threshold.

In an additional advantageous embodiment of the present invention, the second speed threshold essentially corresponds to the speed, below which the speed of the wheel can no longer be measured using the measuring method implemented in the vehicle. In this context, the second speed threshold is advantageously between 1.5 km/h and 3.0 km/h.

In another advantageous embodiment of the present invention, the first speed threshold is determined as a function of the vehicle's driving situation.

In another advantageous embodiment of the present invention, the first speed threshold is selected so that the vehicle's engine is uncoupled. In this context, the first speed threshold lies advantageously between 3.0 km/h and 6.0 km/h, or, provided the engine is uncoupled, between 4.0 km/h and 5.0 km/h.

In an additional advantageous embodiment of the present invention, an average deceleration value is determined from the difference between the first speed threshold and the second speed threshold, as well as from the time period in which the speed of the vehicle during braking has a value between the first speed threshold and the second speed threshold.

In another advantageous embodiment of the present invention, a characteristic curve between the vehicle deceleration and the quantity representing the braking force is selected as a function of the average deceleration value and the value of the quantity representing the braking force during the time period in which the vehicle's speed during braking has a value between the first speed threshold and the second speed threshold.

In an additional advantageous embodiment of the present invention, while the vehicle is traveling at a speed below the second speed threshold, the instantaneous deceleration of the vehicle is determined from the value of the quantity representing the braking force using the selected characteristic curve, and at least one of the quantities, complete-stop instant and complete-stop location, of the vehicle is determined on the basis of the instantaneous deceleration.

In a further advantageous embodiment of the present invention, for a braking pressure up to 20 bar, in particular up to 10 bar, the characteristic curve between the vehicle deceleration and the braking pressure is selected so that the inclination of the roadway on which the vehicle is braking is an arbitrary parameter of a family of characteristics between the vehicle deceleration and braking pressure. Selecting the roadway inclination as an arbitrary parameter is equivalent to selecting the acceleration, conditional upon the roadway inclination, as an arbitrary parameter.

In a further advantageous embodiment of the present invention, for a braking pressure above 10 bar, in particular above 20 bar, the characteristic curve between the vehicle deceleration and the braking pressure is selected so that the vehicle mass is an arbitrary parameter of a family of characteristics between the vehicle deceleration and braking pressure.

In a further advantageous embodiment of the present invention, at least one of the values for acceleration, conditional upon the inclination of the roadway on which the vehicle is braking, and for the vehicle's mass (or a quantity essentially proportional to the mass) is determined as a function of the average deceleration value and of the value of the quantity representing the braking force during the time period in which the vehicle's speed during braking has a value between the first speed threshold and the second speed threshold.

In an additional advantageous embodiment of the present invention, when starting the vehicle after a complete stop, the brake is released as a function of at least one of the quantities for the inclination of the roadway on which the vehicle is braking (or for acceleration conditional upon the roadway inclination) and for the vehicle's mass.

Further advantages and details are revealed in the subsequent description of the exemplary embodiments. The individual figures show.

Figure 1:
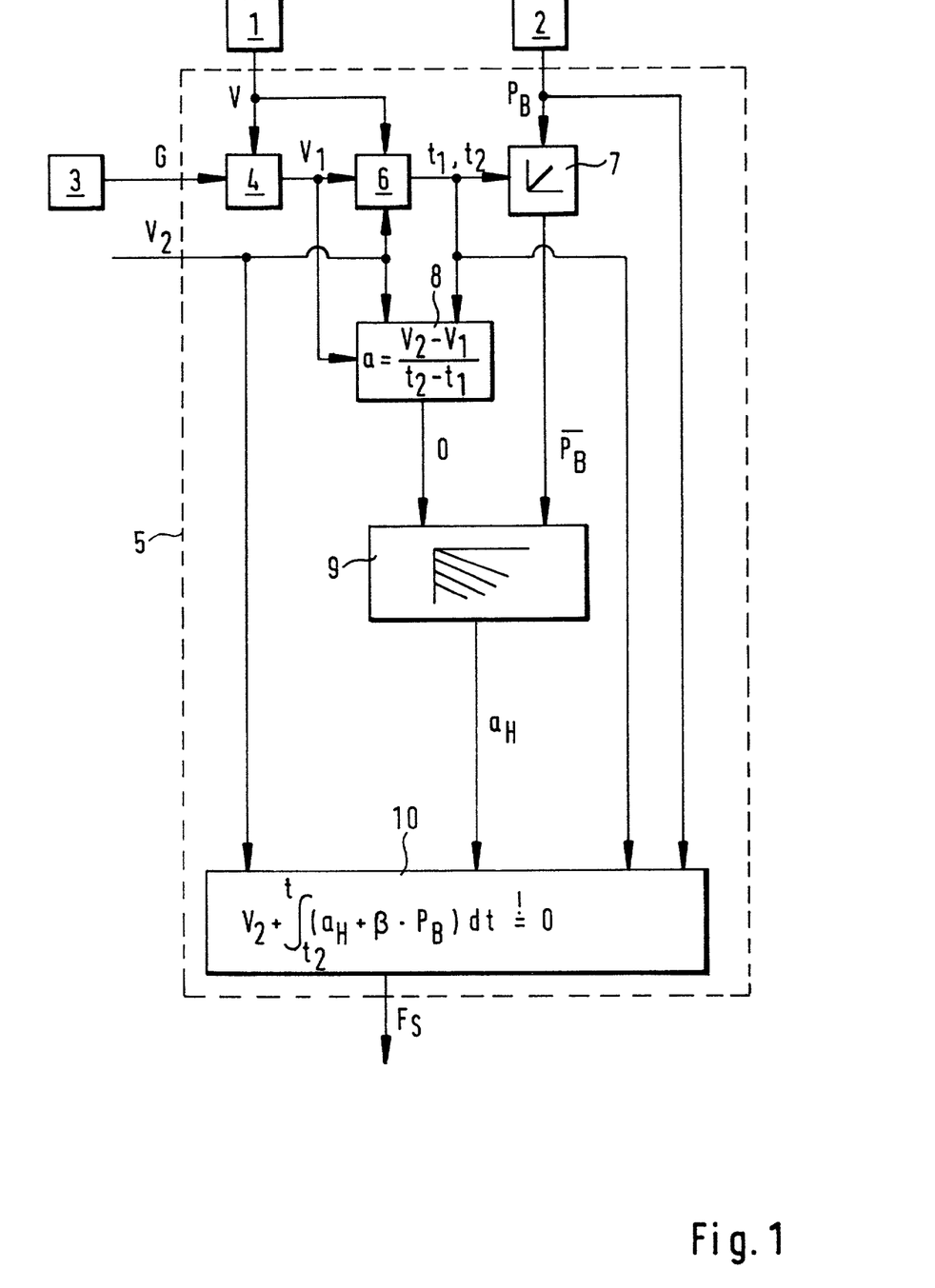
FIG. 1 an exemplary embodiment of a device for detecting a complete stop.

FIG. 1 illustrates an exemplary embodiment of a device 5 for detecting a complete stop according to the present invention. Device 5 for detecting a complete stop determines a complete-stop flag $F_S$ as a function of a second speed threshold $V_2$, a transmission value G, speed v of the vehicle whose complete stop is to be detected, and of braking pressure $p_B$ of the vehicle's brake. A speed sensor, such as a speedometer, is provided for measuring speed. If a vehicle dynamics control (FDR) is implemented in a road vehicle as described, for example, in the article "FDR—die Fahrdynamikregelung von Bosch", (FDR—Bosch Vehicle Dynamics Control System) by A. van Zanten, R. Erhardt, and G. Pfaff in Automobiltechnische Zeitschrift (ATZ) 96, 1994, 11, pp. 674–689, the value calculated in the vehicle dynamics control is advantageously used for the speed. A pressure sensor or a pressure monitor 2 is provided for determining braking pressure $p_B$. Transmission value G indicates if transmission 3 has decoupled the vehicle's engine. Advantageously, speed threshold $v_2$ is selected so that it essentially corresponds to the speed, below which the speed of one of the vehicle's wheels can no longer be measured, in particular using the sensory technology implemented in the vehicle. In this context, second speed threshold $v_2$ is typically between 1.5 km/h and 3.0 km/h.

Device 5 for detecting a complete stop has a threshold-value calculator 4, which calculates a first speed threshold $v_1$. In this context, threshold-value calculator 4 determines first speed threshold $v_1$ in such a way that the vehicle's engine is uncoupled. For this purpose, threshold-value calculator 4 receives transmission value G, which indicates whether the engine is uncoupled. It is advantageous when first speed threshold $v_1$ is low. Therefore, speed v is supplied to threshold-value calculator 4. If the engine is uncoupled at a speed of between 4.0 km/h and 5.0 km/h, threshold-value calculator 4 places speed threshold $v_1$ in this range. If the engine is not yet uncoupled at a speed of 4 km/h, threshold-value calculator 4 defines a lower speed than first speed threshold $v_1$, e.g., 3.0 km/h.

Figure 2:
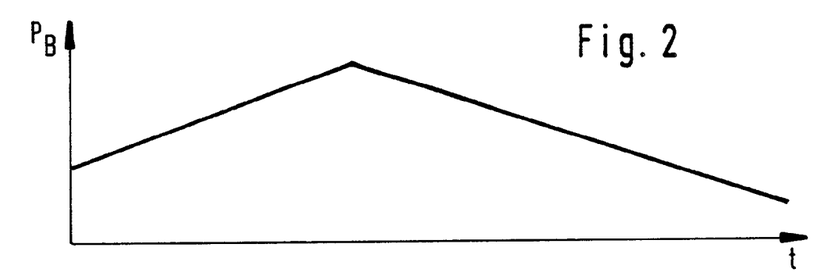
FIG. 2 the braking pressure of the vehicle over time.
Figure 3:
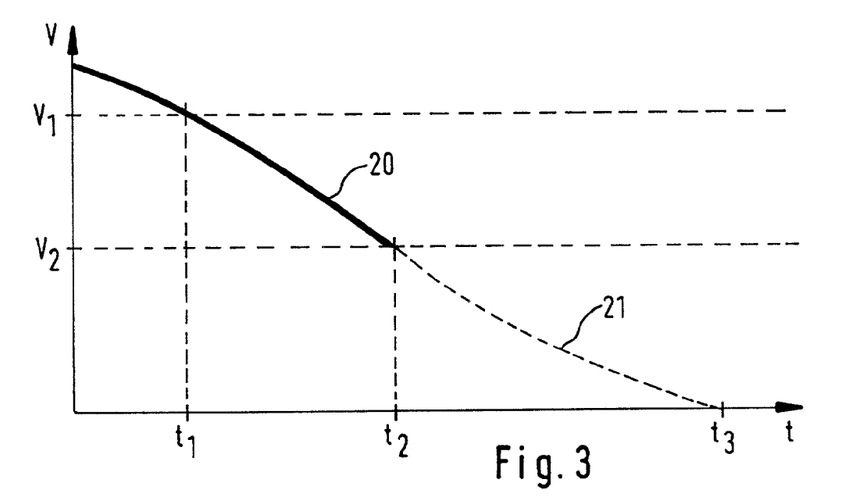
FIG. 3 the vehicle's speed over time.

Device 5 for detecting a complete stop also has a comparator 6, which determines points of time $t_1$ and $t_2$, at which vehicle's speed v equals first speed threshold $v_1$ and second speed threshold $v_2$, respectively. This is clarified in FIG. 3, where speed v is plotted over time t, the vehicle whose speed profile is shown in FIG. 3 braking with a braking pressure $p_B$ according to FIG. 2. As FIG. 3 shows, $t_1$ is the instant when v assumes value $v_1$, and $t_2$ is the instant when v assumes value $v_2$.

Furthermore, device 5 for detecting a complete stop has an averager 7, which generates average value $\bar{p}_B$ of braking pressure $p_B$ between the two instants $t_1$ and $t_2$. Device 5 for detecting a complete stop also has a deceleration calculator 8 for calculating an average vehicle deceleration a. In this context, average deceleration a is expressed as:

$$a = \frac{v_2 - v_1}{t_2 - t_1}$$

Figure 5:
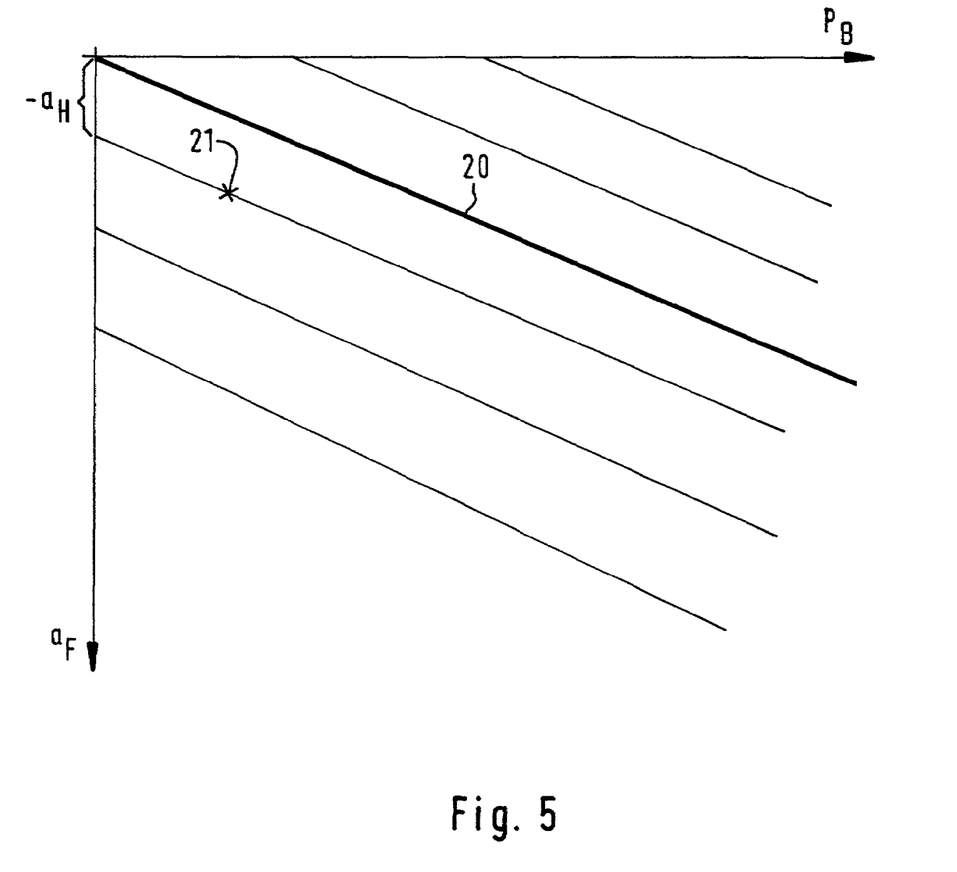
FIG. 5 a family of characteristic curves between the braking pressure and the vehicle deceleration, including the acceleration which acts on the vehicle as a result of the roadway inclination as an arbitrary parameter.

Acceleration $a_H$, which acts on the vehicle based on the roadway inclination, is determined from thus determined average deceleration a and from average value $\bar{p}_B$ of braking pressure $p_B$, using a downgrade-force calculator 9. In this context, a family of characteristic curves between braking pressure $p_B$ and vehicle deceleration $a_f$, including acceleration $a_H$, which acts on the vehicle due to roadway inclination, as an arbitrary parameter, as shown in FIG. 5 is used as a baseline. In FIG. 5, straight line 20 denotes the relation between braking pressure $p_B$ and vehicle deceleration $a_f$ on a straight roadway. If the point derived from the average deceleration and average braking pressure $\bar{p}_B$ is plotted on such a family of characteristics, a reading can be taken for acceleration $a_H$, acting on the vehicle due to roadway inclination. In the present exemplary embodiment, a purely linear family of characteristics is chosen. Thus, acceleration $a_H$, acting on the vehicle due to the roadway inclination, is expressed as:

$$a_H = a - \beta \bar{p}_B$$

Acceleration $a_H$ thus calculated, which acts on the vehicle on account of the roadway inclination, is an input quantity in an instant-of-complete-stop calculator 10, as are instant $t_2$, instantaneous braking pressure $p_B$, and second speed threshold $v_2$. In this context, complete-stop instant $t_3$ is calculated in such a way that the following is valid:

$$v_2 + \int_{t_2}^{t_3} (a_H + \beta p_B) dt \stackrel{!}{=} 0$$

If the complete stop of the vehicle is reached, instant-of-complete-stop calculator 10 sets complete-stop flag $F_s$ to value 1.

If complete-stop location $S_3$ is also to be determined, it is calculated as:

$$s_3 = \int_{t_2}^{t_3} \int_{t_2}^{t_3} (a_H + \beta p_B) dt dt$$

Figure 4:
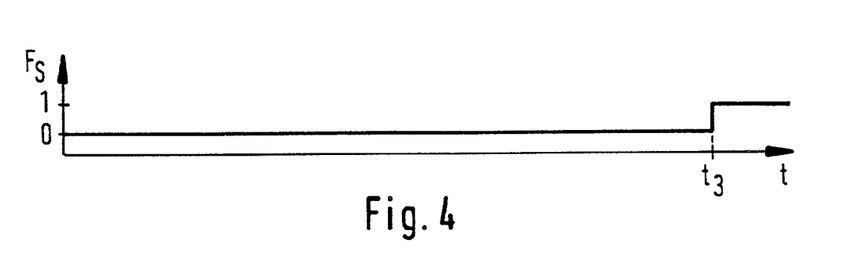
FIG. 4 a complete-stop flag over time.

In the present exemplary embodiment, instant-of-complete-stop calculator 10 outputs a complete-stop flag $F_s$, which assumes value 1 when a complete stop is detected, and value 0 when complete stop is not detected. FIG. 4 shows the time characteristic of complete-stop flag $F_s$ for the present example.

FIG. 3 illustrates the method of operation of device 5 for detecting a complete stop. Until vehicle's speed v reaches second speed threshold $v_2$, speed v is known. This is elucidated by solid line 20. Below this second speed threshold $v_2$, vehicle's speed v, indicated by dotted line 21, can no longer be measured by the vehicle's speed sensor technology. However, the speed can be calculated using instant-of-complete-stop calculator 10 as:

$$v = v_2 + \int_{t_2}^{t} (a_H + \beta p_B) dt$$

Figure 6:
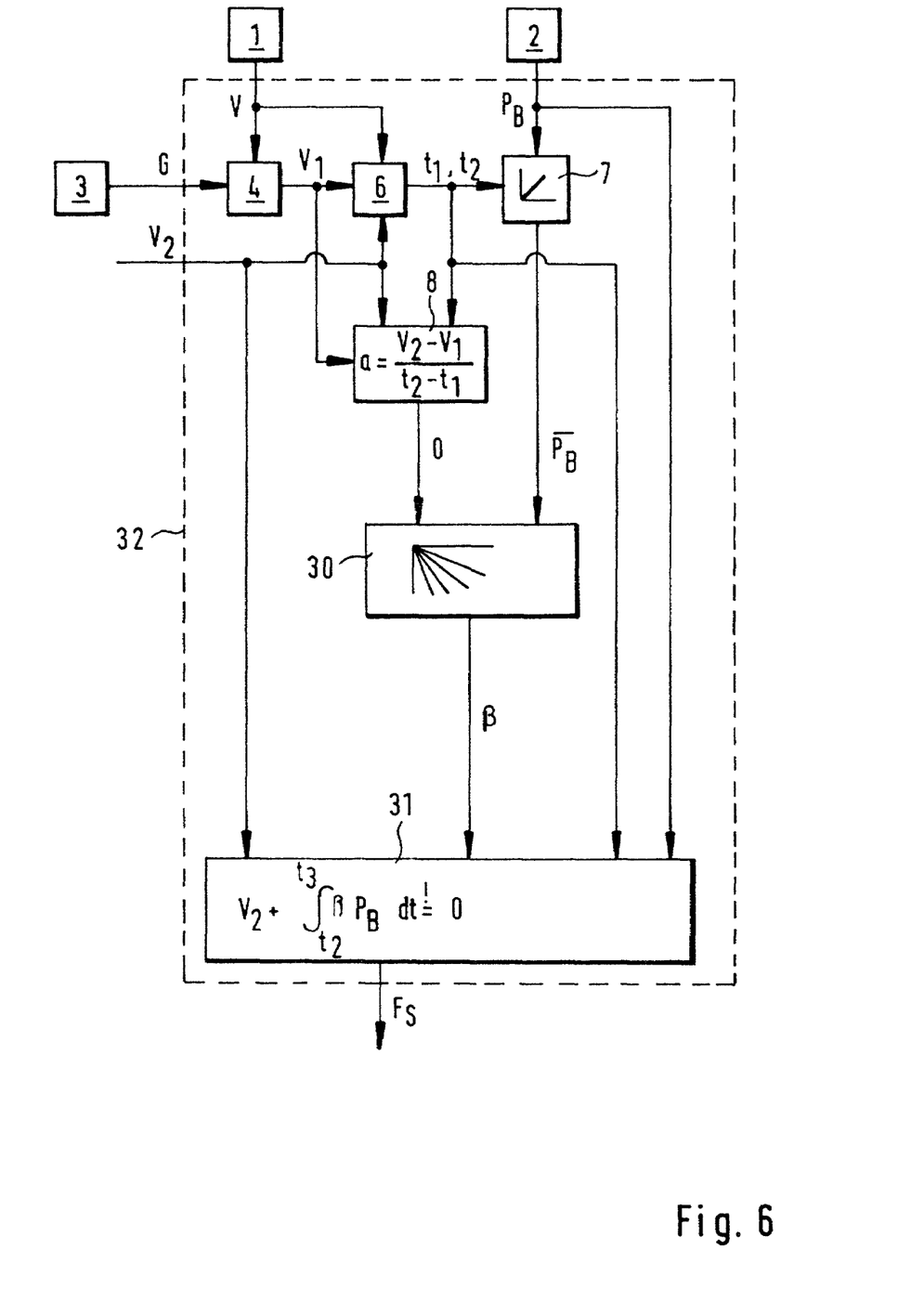
FIG. 6 an additional exemplary embodiment of a device for detecting a complete stop.
Figure 7:
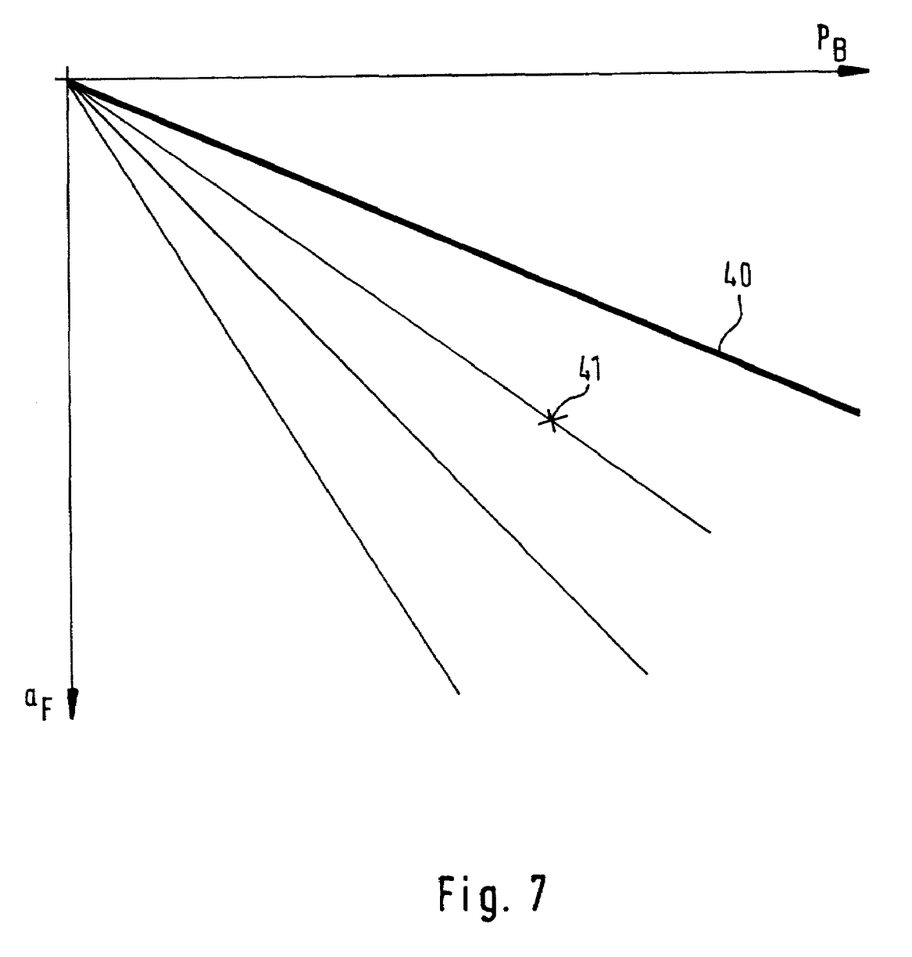
FIG. 7 a family of characteristic curves between the braking pressure and the vehicle deceleration, including the laden state of the vehicle as an arbitrary parameter.

Advantageously, in accordance with FIG. 1, complete stop calculation device 5 is used for braking pressure $p_B$ of up to 20 bar, in particular of up to 10 bar. On the other hand, for higher braking pressures $p_B$, in particular for braking pressures $p_B$ above 20 bar, a device 32 for detecting a complete stop, as shown is FIG. 6, is advantageously used. Laden-state calculator 30, which replaces downgrade-force calculator 9 in FIG. 1, and instant-of-complete-stop calculator 31, which replaces instant-of-complete-stop calculator 10 in FIG. 1, differentiate device 32 for detecting a complete stop from device 5 for detecting a complete stop. Laden-state calculator 30 disregards the influence of the roadway inclination. On the other hand, laden-state calculator 30 determines a value β, which is essentially proportional to the vehicle's mass. For this purpose, a family of characteristics is the basis for laden-state calculator 30, as shown in FIG. 7 in an exemplary embodiment. FIG. 7 shows a family of characteristics, including the vehicle's mass as an arbitrary parameter. As the vehicle's mass changes, so does gradient β of the straight lines of the family of characteristics. In this context, straight line 40 denotes the relation between braking pressure $p_B$ and vehicle deceleration $a_F$ for an unladen vehicle. Using acceleration a and average braking pressure$_B$, a point 41, from which value β is derived, is established in the family of characteristics. A simple linear relation is used as a basis for the present exemplary embodiment, so that β is expressed as:

$$\beta = \frac{a}{p_B}$$

Value β, thus calculated, is an input quantity in instant-of-complete-stop calculator 31, as are instant $t_2$, instantaneous braking pressure $p_B$, and second speed threshold $v_2$. In this context, complete-stop instant t3 is calculated in such a way that the following is valid:

$$v_2 + \int_{t_2}^{t_3} \beta p_B dt \stackrel{!}{=} 0$$

If the complete stop of the vehicle is reached, instant-of-complete-stop calculator 31 sets complete-stop flag $F_s$ to value 1.

If complete-stop location $S_3$ is also to be determined, it is calculated as follows:

$$s_3 = \int_{t_2}^{t_3} \int_{t_2}^{t_3} \beta p_B dt dt$$

Figure 8:
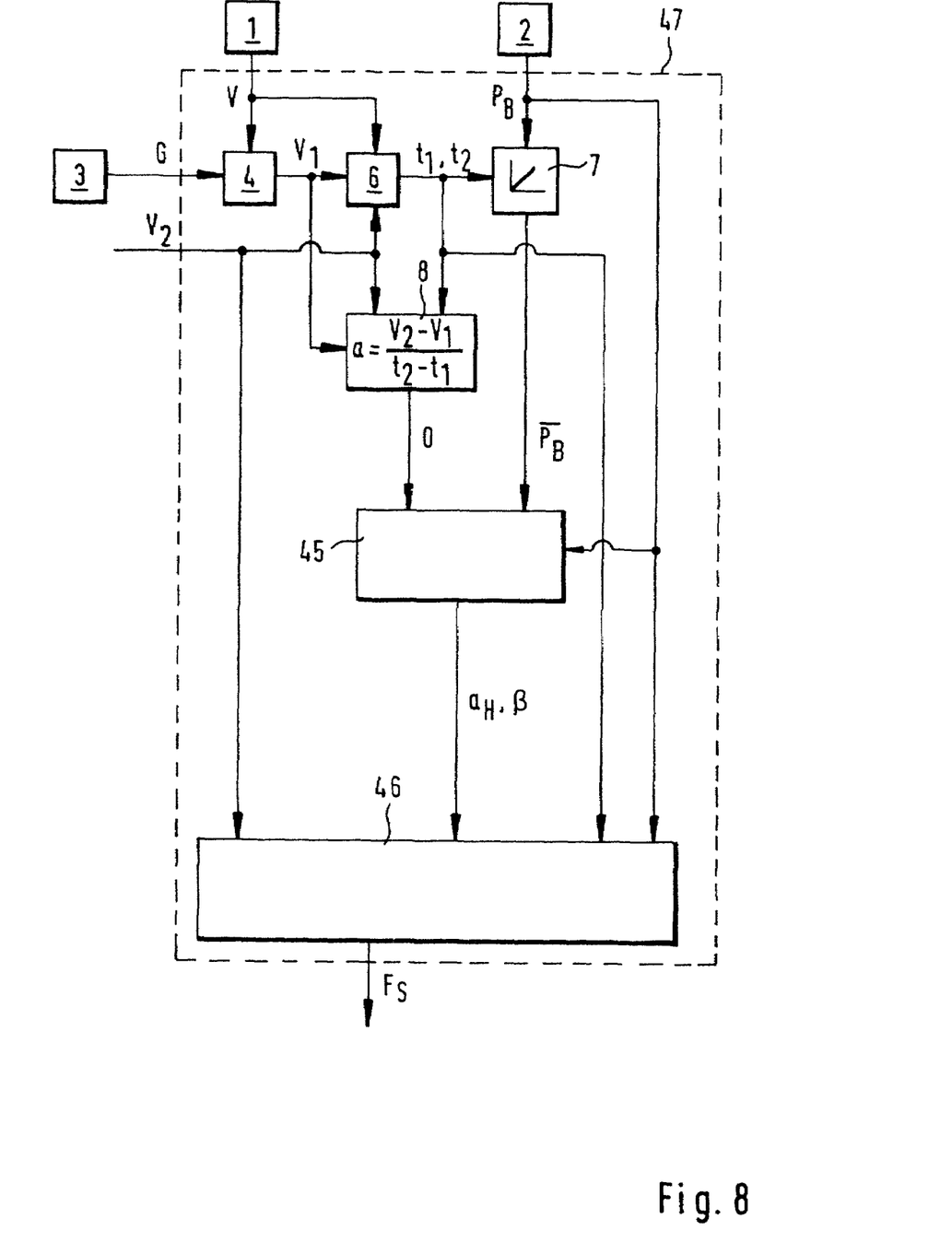
FIG. 8 a particularly advantageous embodiment of a device for detecting a complete stop.

FIG. 8 shows a particularly advantageous exemplary embodiment of a device 47 for detecting a complete stop. Disturbance-value calculator 45, which replaces downgrade-force calculator 9 in FIG. 1 and laden-state calculator 32 in FIG. 6, respectively, and instant-of-complete-stop calculator 46, which replaces instant-of-complete-stop calculator 10 in FIG. 1 and instant-of-complete-stop calculator 31 in FIG. 6, respectively, differentiate device 47 for detecting a complete stop from device 5 for detecting a complete stop and device 32 for detecting a complete stop.

When instantaneous braking pressure $p_B$ is lower than a pressure limit value, disturbance-value calculator 45 determines acceleration $a_H$, which acts on the vehicle due to the roadway inclination, using the same method as that of downgrade-force calculator 9, and when braking pressure $p_B$ is greater than the pressure limit value, disturbance-value calculator 45 determines value β using the same method as that of laden-state calculator 30. The pressure limit value is 20 bar, for example. When braking pressure $p_B$ is lower than the pressure limit value, instant-of-complete-stop calculator 46 determines the value of complete-stop flag $F_s$ using the same method as that of instant-of-complete-stop calculator 10. However, if braking pressure $p_B$ is greater than the pressure limit value, instant-of-complete-stop calculator 46 calculates complete-stop flag $F_s$ using the same method as that of instant-of-complete-stop calculator 31.

In one advantageous refinement, the family of characteristics underlying downgrade-force calculator 9 and laden-state calculator 30, respectively, is calibrated during braking. Thus, the actual instantaneous characteristic curve between braking pressure $p_B$ and vehicle deceleration $a_F$ can be determined from the change in braking pressure $p_B$ during braking operations. If the roadway inclination remains constant during braking, the roadway inclination and the braking curve (relation between braking pressure and vehicle deceleration) can be determined. The engine drag torque is then preferably deducted to the degree it is known. For calibrating the characteristic curves, for example, vehicle deceleration $a_F$ is stored at the beginning of braking, and the relation between braking pressure $p_B$ and vehicle deceleration $a_F$ is subsequently determined. The thus determined relation can be approximated, for example, using a mean straight line.

Figure 9:
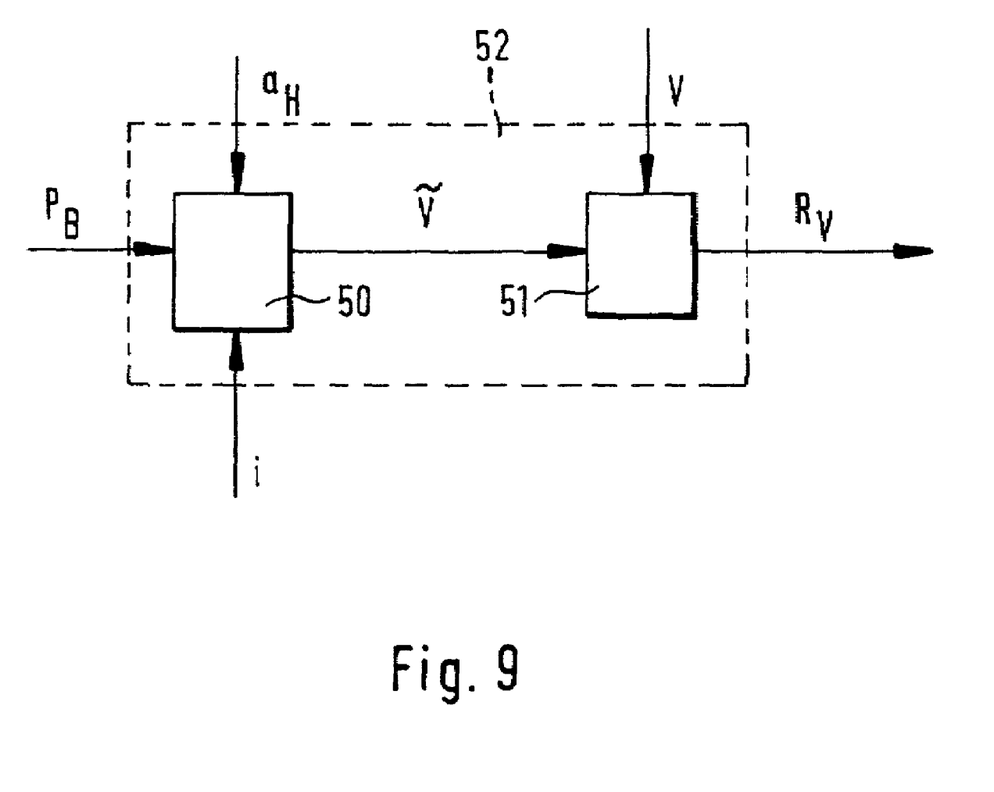
FIG. 9 a travel-direction detection which cooperates with a device for detecting a complete stop.

The device for detecting a complete stop is implemented in a particularly advantageous way together with a travel direction detection. An exemplary embodiment of such a travel direction detection 52 is shown in FIG. 9. Travel direction detection 52 has a speed estimator 50 for calculating an estimated speed value and a comparator 51. Speed estimator 50 calculates estimated speed value as:

$$\tilde{v} = \int_{t_0}^{t_4} \left( \frac{M_{mot} i_{getr}}{m_f r_{rad}} + a_H + \beta p_B \right) dt$$

$M_{mot}$ being the engine torque;
$i_{getr}$ being the transmission ratio;
$m_f$ being the vehicle's mass; and
$r_{rad}$ being the wheel radius.

Comparator 51 is used to compare estimated speed value to a value for speed v measured at instant $t_4$ or determined by a vehicle dynamics control FDR (see above). If v and essentially correspond in absolute value, then the operational sign of represents travel direction $R_v$.

Figure 10:
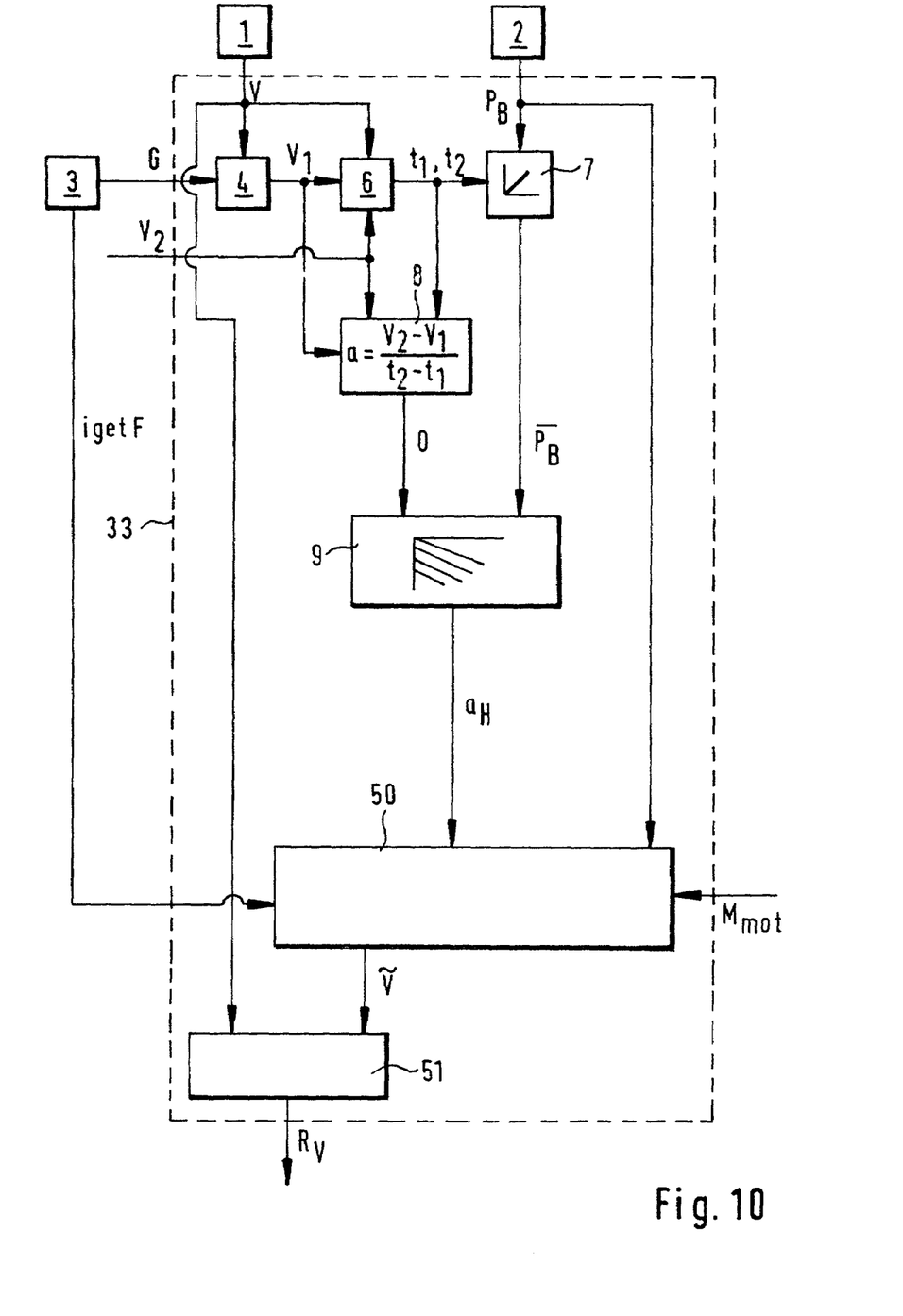
FIG. 10 an independent travel-direction detection.

FIG. 10 illustrates an exemplary embodiment for an independent travel direction detection 53, i.e., a travel direction detection without the complete-stop detection according to the present invention. In this context, reference numerals 1 through 9 are equivalent to those in FIG. 1, and reference numerals 50 and 51 to those in FIG. 9. By using a travel direction detection device of this kind, travel direction $R_v$ can be detected even without complicated travel-direction detection sensor technology.

The invention claimed is:

1. A method for detecting the complete stop of a vehicle, the complete stop being detected as a function of one quantity representing braking force when the vehicle is braked and as a function of one of the vehicle's speed and the speed of at least one of the vehicle's wheels.

2. The method according to claim 1, characterized in that the complete-stop detection is also carried out as a function of at least two speed thresholds, a first speed threshold ($v_1$) and a second speed threshold ($v_2$).

3. The method according to claim 2, characterized in that the second speed threshold (v2) essentially corresponds to the speed below which the vehicle's speed can no longer be measured using the measuring method implemented in the vehicle.

4. The method according to claim 2, characterized in that the second speed threshold (V2) is between 1.5 km/h and 3.0 km/h.

5. The method according to claim 2, characterized in that the first speed threshold (v1) is established as a function of the vehicle's driving situation.

6. The method according to claim 2, characterized in that the first speed threshold (v1) is selected in such a way that the vehicle's engine is uncoupled.

7. The method according to one of claims 2, characterized in that the first speed threshold (v1) is between 3.0 km/h and 6.0 km/h, preferably between 4.0 km/h and 5.0 km/h.

8. The method according to claims 2, characterized in that an average deceleration value (a) is generated from the difference between the first speed threshold (v1) and the second speed threshold (v2), as well as from the time period (t2–t1) in which the vehicle's speed (v) has a value between the first speed threshold (v1) and the second speed threshold (v2) during braking.

9. The method according to claim 8, characterized in that a characteristic curve between vehicle deceleration (a) and quantity (pB) representing the braking force is selected as a function of the average deceleration value (a) and average value (pB) of the quantity representing the braking force during the time period (t2–t1) in which the vehicle's speed (v) has a value between first speed threshold (v1) and second speed threshold (v2) during braking.

10. The method according to claim 9, characterized in that while the vehicle is traveling at a speed (v) below the second speed threshold (v2), the instantaneous vehicle deceleration ($aH+\beta$ pB, $\beta pB$) is determined from the quantity (Pn) representing the braking force using the selected characteristic curve, and in that at least one of the quantities, complete-stop instant of the vehicle and complete-stop location of the vehicle, is determined using instantaneous deceleration ($aH+\beta$ pB, $\beta pB$).

11. The method according to one of claims 8, characterized in that at least one of the values
vehicle acceleration conditional upon the inclination of the roadway on which the vehicle is braking; and
mass of the vehicle is determined as a function of the average deceleration value (a) and of the value of the quantity (pB) representing the braking force for the time period in which the vehicle's speed has a value between first speed threshold (v1) and second speed threshold (v2) during braking.

12. The method according to claim 11, characterized in that starting the vehicle after a complete stop occurs as a function of at least one of the values
vehicle acceleration conditional upon the inclination of the roadway on which the vehicle is braking; and
mass of the vehicle, force when the vehicle is braked.

13. The method according to claim 1, in particular when the vehicle has a hydraulic brake, characterized in that braking pressure (pB) of the brake, of a hydraulic brake in particular, is the quantity representing the braking force.

14. The method according to claim 13, characterized in that the characteristic curve between vehicle deceleration (af) and the braking pressure (PB) for a braking pressure (pB) up to 20 bar, in particular up to 10 bar, is selected so that the inclination of the roadway on which the vehicle is braking is an arbitrary parameter of a family of characteristics between vehicle deceleration (af) and braking pressure (PB).

15. The method according to claim 13, characterized in that for a braking pressure (pB) above 10 bar, in particular above 20 bar, the characteristic curve between vehicle deceleration (af) and braking pressure (pB) is selected in such a way that the vehicle's mass is an arbitrary parameter of a family of characteristics between vehicle deceleration (af) and braking pressure (pB).

16. A method for detecting a complete stop of a vehicle, comprising the step of:
detecting the complete stop as a function of one quantity representing a braking force when the vehicle is braked and as a function of one of a vehicle speed and a speed of at least one vehicle wheel.

17. The method according to claim 16, wherein the complete stop is detected in the complete stop detecting step as a function of the one quantity representing the braking force when the vehicle is braked, as a function of the one of the vehicle speed and the speed of the at least one vehicle wheel and as a function of at least two speed thresholds.

18. The method according to claim 17, wherein the at least two speed thresholds includes a first speed threshold and a second speed threshold.

19. The method according to claim 18, wherein the second speed threshold substantially corresponds to a speed below which the vehicle speed can not be measuring in accordance with a measuring method performed by the vehicle.

20. The method according to claim 18, wherein the second speed threshold is between 1.5 km/h and 3.0 km/h.

21. The method according to claim 18, further comprising the step of establishing the first speed threshold as a function of a vehicle driving situation.

22. The method according to claim 18, further comprising the step of selecting the first speed threshold so that a vehicle engine is uncoupled.

23. The method according to claim 18, wherein the first speed threshold is between 3.0 km/h and 6.0 km/h.

24. The method according to claim 18, wherein the first speed threshold is between 4.0 km/h and 5.0 km/h.

25. The method according to claim 18, further comprising the step of generating an average deceleration value from a difference between the first speed threshold and the second speed threshold and from a time period in which the vehicle speed has a value between the first speed threshold and the second speed threshold during braking.

26. The method according to claim 25, further comprising the step of selecting a characteristic curve between a vehicle deceleration and the quantity representing the braking force as a function of the average deceleration value and an average value of the quantity representing the braking force during the time period in which the vehicle speed has a value between the first speed threshold and the second speed threshold during braking.

27. The method according to claim 26, further comprising the steps of:

determining, while the vehicle is traveling at a speed below the second speed threshold, an instantaneous vehicle deceleration from the quantity representing the braking force using the characteristic curve selected in the characteristic curve selecting step; and determining a complete-stop instant of the vehicle and a complete-stop location of the vehicle in accordance with the instantaneous deceleration.

28. The method according to claim 26, wherein the vehicle includes a hydraulic brake, the quantity representing the braking force including a braking pressure of the brake, the characteristic curve is selected in the characteristic curve selecting step between the vehicle deceleration and the braking pressure for a braking pressure up to 20 bar so that an inclination of a roadway on which the vehicle is braking is an arbitrary parameter of a family of characteristics between the vehicle deceleration and the braking pressure.

29. The method according to claim 28, wherein, for a braking pressure above 10 bar, the characteristic curve is selected in the characteristic curve selecting step between the vehicle deceleration and the braking pressure so that a vehicle mass is an arbitrary parameter of a family of characteristics between the vehicle deceleration of the braking pressure.

30. The method according to claim 26, wherein the vehicle includes a hydraulic brake, the quantity representing the braking force including a braking pressure of the brake, the characteristic curve is selected in the characteristic curve selecting step between the vehicle deceleration and the braking pressure for a braking pressure up to 10 bar so that an inclination of a roadway on which the vehicle is braking is an arbitrary parameter of a family of characteristics between the vehicle deceleration and the braking pressure.

31. The method according to claim 28, wherein, for a braking pressure above 20 bar, the characteristic curve is selected in the characteristic curve selecting step between the vehicle deceleration and the braking pressure so that a vehicle mass is an arbitrary parameter of a family of characteristics between the vehicle deceleration of the braking pressure.

32. The method according to claim 25, further comprising the step of determining, as a function of the average deceleration value and a value of the quantity representing the braking force of the time period in which the vehicle speed has a value between the first speed threshold and the second speed threshold during braking, at least one of vehicle acceleration conditional upon an inclination of a roadway on which the vehicle is braking and a mass of the vehicle.

33. The method according to claim 32, further comprising the step of starting the vehicle after a complete stop occurs as a function of at least one of the vehicle acceleration conditional upon the inclination of the roadway on which the vehicle is braking and the mass of the vehicle.

34. The method according to claim 16, wherein the vehicle includes a hydraulic brake, the quantity representing the braking force including a braking pressure of the brake.

* * * * *

UNITED STATES PATENT AND TRADEMARK OFFICE
CERTIFICATE OF CORRECTION

PATENT NO. : 7,110,872 B2
APPLICATION NO. : 09/748341
DATED : September 19, 2006
INVENTOR(S) : Eberhard Holl It is certified that error appears in the above-identified patent and that said Letters Patent is hereby corrected as shown below:

Column 7, line 28, change "according to claims 2," to --according to claim 2,--

Column 7, line 52, change "according to one of claims 8," to --according to claim 8,--

Column 7, line 67, change "mass of the vehicle , force when the vehicle is braked." to --mass of the vehicle.--

Signed and Sealed this

Thirteenth Day of February, 2007

JON W. DUDAS
*Director of the United States Patent and Trademark Office*